US012749906B2

(12) United States Patent
Ohashi et al.

(10) Patent No.: US 12,749,906 B2
(45) Date of Patent: Sep. 29, 2026

(54) POWER SUPPLY DEVICE AND POWER SUPPLY CONTROL CIRCUIT

(71) Applicant: Panasonic Energy Co., Ltd., Osaka (JP)

(72) Inventors: Osamu Ohashi, Osaka (JP); Takuro Hase, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 78 days.

(21) Appl. No.: 18/849,742

(22) PCT Filed: Feb. 21, 2023

(86) PCT No.: PCT/JP2023/006111
§ 371 (c)(1),
(2) Date: Sep. 23, 2024

(87) PCT Pub. No.: WO2023/189011
PCT Pub. Date: Oct. 5, 2023

(65) Prior Publication Data

US 2025/0202250 A1 Jun. 19, 2025

(30) Foreign Application Priority Data

Mar. 29, 2022 (JP) ................................ 2022-052827

(51) Int. Cl.
*H02J 7/60* (2026.01)
*G06F 1/30* (2006.01)
*H02H 7/18* (2006.01)

(52) U.S. Cl.
CPC .................. *H02J 7/60* (2026.01); *G06F 1/30* (2013.01); *H02H 7/18* (2013.01); *H02J 7/663* (2026.01); *Y02E 60/10* (2013.01)

(58) Field of Classification Search
CPC ...... G06F 1/30; H02H 7/18; H02J 7/60; H02J 7/663; Y02E 60/10
See application file for complete search history.

(56) References Cited

U.S. PATENT DOCUMENTS 10,017,138 B2 * 7/2018 Kamioka .............. B60R 16/033
2011/0001456 A1 * 1/2011 Wang ........................ H02J 7/54
320/117

(Continued)

FOREIGN PATENT DOCUMENTS

JP 2014-018062 1/2014

OTHER PUBLICATIONS

International Search Report of PCT application No. PCT/JP2023/006111 dated May 16, 2023.

(Continued)

*Primary Examiner* — Terrell S Johnson
(74) *Attorney, Agent, or Firm* — Rimon P.C.

(57) ABSTRACT

A power supply device includes a charge-discharge switching element connected in series to a battery module and configured to charge and discharge the battery module, an analog circuit configured to control turning on and off of the charge-discharge switching element, and a digital circuit configured to control the analog circuit. The analog circuit includes an analog-side communication terminal configured to receive, from the digital circuit by communication, an instruction controlling turning on and off of the charge-discharge switching element, and a switch-OFF terminal configured to turn off the charge-discharge switching element. The switch-OFF terminal is different from the analog-side communication terminal. The power supply device further includes a switch-OFF circuit configured to output an OFF signal to turn off the charge-discharge switching ele- (Continued)

ment to the switch-OFF terminal in response to a non-operating state of the digital circuit.

6 Claims, 3 Drawing Sheets

(56) References Cited

U.S. PATENT DOCUMENTS

| | | | | |
|---|---|---|---|---|
| 2011/0305926 | A1* | 12/2011 | Kim | H02J 7/663 429/50 |
| 2014/0008976 | A1 | 1/2014 | Yebka et al. | |

OTHER PUBLICATIONS

The EPC Office Action dated Aug. 26, 2025 for the related European Patent Application No. 23779041.5.

* cited by examiner

POWER SUPPLY DEVICE AND POWER SUPPLY CONTROL CIRCUIT

TECHNICAL FIELD

The present disclosure relates to a power supply device and a power supply control circuit controlling a power supply device.

BACKGROUND ART

A power supply device including secondary battery cells connected in series or parallel to one another includes a power supply control circuit controlling charge and discharge of a secondary battery. The power supply control circuit includes a switching element, such as an FET, for charging and discharging the secondary battery, an analog circuit called an analog front end (AFE) controlling turning on and off of the switching element, and a digital circuit, such as a microcomputer, controlling the analog front end. In this power supply control circuit, the microcomputer controls the analog front end such that the switching element is turned OFF when an abnormality in charging and discharging of a secondary battery is detected.

CITATION LIST

Patent Literature

PTL 1: Japanese Patent Laid-Open Publication No. 2014-18062

SUMMARY OF INVENTION

In the conventional power supply control circuit described above, an analog front end receives power supply necessary for an operation from the secondary battery. On the other hand, the microcomputer receives a microcomputer powering voltage from an external 12V power supply. In this configuration, when the microcomputer cannot receive power supply and be in a non-operating state because, for example, a part configured to power the microcomputer fails and the switching element cannot be turned off when an abnormality occurs in charging or discharging.

A power supply device according to an aspect of the present disclosure is a power supply device includes: a battery module; a charge-discharge switching element connected in series to the battery module, the charge-discharge switching element being configured to charging and discharging the battery module; an analog circuit configured to controlling turning on and off of the charge-discharge switching element; a digital circuit configured to control the analog circuit; an analog-side communication terminal configured to receive, from the digital circuit by communication, an instruction controlling the turning on and off of the charge-discharge switching element; a switch-OFF terminal configured to turn off the charge-discharge switching element, the switch-OFF terminal being different from the analog-side communication terminal; and a switch-OFF circuit configured to output an OFF signal to turn off the charge-discharge switching element to the switch-OFF terminal in response to a non-operating state of the digital circuit. The digital circuit includes a digital-side power feeding terminal configured to receive, from outside, driving power to power the digital circuit. The switch-OFF circuit is configured to output the OFF signal to the switch-OFF terminal in response to a state in which the digital circuit does not receive the power from the digital-side power feeding terminal.

A power supply control circuit according to another aspect of the present disclosure is a power supply control circuit configured to operate with a power supply device including a battery module and a charge-discharge switching element connected in series to the battery module. The charge-discharge switching element is configured to charge and discharge the battery module. The power supply control circuit is configured to turn off the charge-discharge switching element when an abnormality occurs. The power supply control circuit includes: an analog circuit configured to control turning on and off of the charge-discharge switching element; a digital circuit configured to control the analog circuit; and a switch-OFF circuit configured to control the charge-discharge switching element. The analog circuit includes: an analog-side communication terminal configured to control the turning on and off of the charge-discharge switching element in response to an instruction from the digital circuit; and a switch-OFF terminal configured to turn off the charge-discharge switching element, the switch-OFF terminal being different from the analog-side communication terminal. The switch-OFF circuit is configured to input, to the switch-OFF terminal, an OFF signal turning off the charge-discharge switching element in response to a non-operating state of the digital circuit.

The power supply device and the power supply control circuit according to the aspects of the present disclosure have an advantageous effect that, even when the digital circuit is in a non-operating state due to, e.g., a power supply failure, the charge-discharge switching element is reliably turned off using the switch-OFF terminal, thus ensuring safety.

DESCRIPTION OF EMBODIMENT

Figure 1:
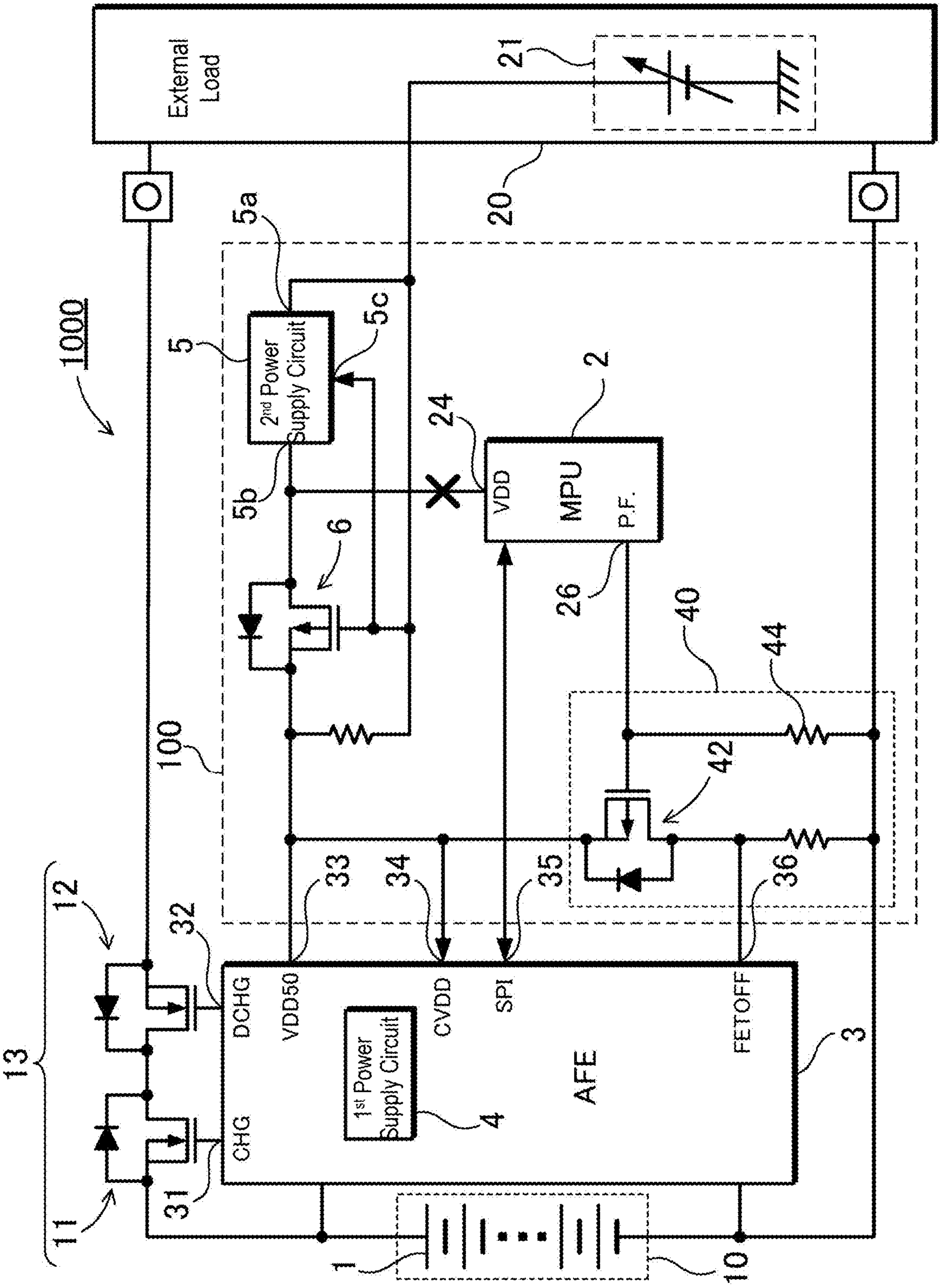
FIG. 1 is a circuit diagram of a power supply device in accordance with Exemplary Embodiment 1 of the present disclosure.

A power supply device according to an aspect of the present disclosure is a power supply device including: a battery module; a charge-discharge switching element connected in series to the battery module, the charge-discharge switching element being configured to charging and discharging the battery module; an analog circuit configured to controlling turning on and off of the charge-discharge switching element; a digital circuit configured to control the analog circuit; an analog-side communication terminal configured to receive, from the digital circuit by communication, an instruction controlling the turning on and off of the charge-discharge switching element; a switch-OFF terminal configured to turn off the charge-discharge switching element, the switch-OFF terminal being different from the analog-side communication terminal; and a switch-OFF circuit configured to output an OFF signal to turn off the charge-discharge switching element to the switch-OFF terminal in response to a non-operating state of the digital circuit. The digital circuit includes a digital-side power feeding terminal configured to receive, from outside, driving power to power the digital circuit. The switch-OFF circuit is configured to output the OFF signal to the switch-OFF terminal in response to a state in which the digital circuit does not receive the power from the digital-side power feeding terminal.

In a power supply device according to another aspect of the present disclosure, in the above aspect, the digital circuit further includes a non-operating terminal configured to have a state changed from an operating state to a non-operating state in response to a non-operating of the digital circuit.

In the power supply device according to still another aspect of the present disclosure, the switch-OFF circuit includes a forced OFF switching element configured to output, to the switch-OFF terminal, an OFF signal turning off the charge-discharge switching element in response to the non-operating state of the non-operating terminal.

In a power supply device of yet another aspect of the present disclosure, in any of the above aspects, the non-operating terminal is configured to be in a floating state as the non-operating state of the digital circuit. The forced OFF switching element comprises a p-channel FET or a PNP transistor configured to output a HIGH signal to the switch-OFF terminal in response to the floating of the non-operating terminal.

In a power supply device of a further aspect of the present disclosure, in any of the above aspects, the analog circuit includes an analog-side power supply terminal connected to the switch-OFF circuit. The switch-OFF circuit is configured to output the OFF signal to the switch-OFF terminal by a voltage output from the analog-side power supply terminal in response to the non-operating state of the digital circuit. In this configuration, even if the digital circuit becomes in a non-operating state, the switch-OFF circuit operates using the analog-side power supply terminal of the analog circuit.

In a power supply device of a further aspect of the present disclosure, in any of the above aspects, the analog circuit includes an analog front end. The digital circuit includes a microcomputer.

Exemplary embodiments of the present invention will be described below with reference to the drawings. However, the exemplary embodiments described below are illustrations to give a concrete form to technical ideas of the present invention, and the present invention is not specifically limited to description below. Furthermore, it should be appreciated that the members shown in claims are not specifically limited to members in the exemplary embodiments. In particular, the dimensions, materials, shapes, relative arrangements, and the like, of the components described in the exemplary embodiment are not intended to limit the scope of the present disclosure thereto but are intended to show examples, unless specifically stated. Note here that the sizes, positional relationships, and the like, of members shown in the drawings may be exaggerated in order to clarify the description. Furthermore, in the following description, the same names and symbols indicate the same or homogeneous members, and detailed descriptions will be omitted as appropriate. Furthermore, each element constituting the present disclosure may be configured such that a plurality of elements is configured from the same member so that one member serves as a plurality of elements, or on the other hand, the function of one member may be performed by a plurality of members.

The power supply device of the present disclosure may be used as a backup power supply for maintaining an operating state by supplying a connected outside load with electric power during power outage of a commercial power supply and the like, and a power supply control circuit for controlling a power supply device. The backup power supply is charged and stored in normal time and used by switching connections during a power outage. The output and capacity of such a backup power supply are determined depending on the applications of use and specifications, such as home use, office use, store use, factory use, and the like. Hereinafter, a power supply device for a server-based power storage system battery module is described as an exemplary embodiment of the present disclosure.

Exemplary Embodiment 1

Power supply device 1000 in accordance with Exemplary Embodiment 1 of the present disclosure is shown in FIG. 1. Power supply device 1000 shown in FIG. 1 is configured to be connected to external load 20 and power external load 20. Power supply device 1000 is also connected to main power supply 21. Main power supply 21 is, for example, an external 12V-power supply and the like. Examples shown in FIG. 1 shows a configuration in which main power supply 21 is included in external load 20, but the configuration is not limited to this example, and a main power supply may be provided as a separate body from the external load.

Power Supply Device 1000

Power supply device 1000 includes battery module 10, charge-discharge switching element 13, and power supply control circuit 100. Power supply control circuit 100 includes an analog circuit, a digital circuit, and switch-OFF circuit 40. The digital circuit is a digital signal processor, such as a microcomputer. As the analog circuit, analog front end ("AFE") 3 is used. AFE 3 links a signal detection device, such as a sensor, to a digital circuit. AFE 3 is configured to adjust an analog signal output from a sensor to a signal easily processed by a digital signal processor, such as a microcomputer.

Power supply device 1000 includes a microcomputer as the digital circuit. In this specification, the microcomputer includes integrated circuits. such as a micro controller unit (MCU), micro-processing unit (MPU) 2, a CPU, and an ASIC. In this exemplary embodiment, MPU 2 is used.

Battery Module 10

Battery module 10 includes battery cells 1 connected in series or parallel to one another. Power supply device 1000 is used as a power storage device configured to store electric power generated by, for example, a solar cell or a fuel cell, to supply electric power to external load 20, or a backup power supply connected to external load 20, such as a server, and to supply electric power to external load 20 to maintain an operating state when power is not supplied from power supply 21 to external load 20. When power supply device 1000 is used as a backup power supply, a period of time for which external load 20, such as a server, is maintained in the operating state during a power outage is longer than a period of time required to start the engine generator, or longer than a period of time required to normally terminate the server. Battery module 10 adjusts the output voltage by the number of battery cells 1 connected in series to one another, and adjusts the output current and overall charge-discharge capacity by the number of battery cells 1 connected in parallel to one another. Battery module 10 has a capacity capable of supplying a power supply voltage to external load 20 continuously for, e.g., several minutes. As battery cell 1, a lithium ion secondary battery may be used. A lithium ion secondary battery has large charge and discharge capacity. However, the present disclosure does not limit battery cell 1 to a lithium ion secondary battery, and all available secondary batteries, such as all solid-state batteries, can be used.

Charge-Discharge Switching Element 13

Charge-discharge switching element 13 is connected in series to battery module 10 and is configured to charge and discharge battery module 10. In the example shown in FIG. 1, charge-discharge switching element 13 includes charge switching element 11 and discharge switching element 12 connected in series to each other. Turning on and off of charge switching element 11 and discharge switching element 12 are controlled by the analog circuit. Charge switching element 11 and discharge switching element 12 are implemented by power semiconductor elements such as FETs. In this specification, the turning off of charge-discharge switching element 13 includes turning off either or both of charge switching element 11 and discharge switching element 12. Charge switching element 11 and discharge switching element 12 are normally turned on.

Power Supply Control Circuit 100

Power supply control circuit 100 includes AFE 3 as the analog circuit, MPU 2 as the digital circuit, and switch-OFF circuit 40. AFE 3 is configured to control turning on and off of charge-discharge switching element 13. MPU 2 is configured to control AFE 3.

MPU 2

MPU 2 is an integrated circuit including a microprocessor configured to digitally processes and monitors battery information, such as voltage, current, and temperature, of battery module 10. MPU 2 is configured to detect, for example, the remaining capacity and the degradation level deterioration of battery module 10, and control the charging and discharging so as to maintain battery module 10 healthy.

AFE 3

AFE 3 is configured to detect analog signals corresponding to analog quantities, such as voltage, current, and temperature, of battery module 10, and control turning on and off of charge switching element 11 and discharge switching element 12 for controlling charging and discharging of battery module 10. For this reason, AFE 3 includes CHG terminal 31 configured to control charge switching element 11 and DCHG terminal 32 configured to control discharge switching element 12.

AFE 3 converts the detected analog signal into a digital signal and supplies the converted digital signal to MPU2. MPU2 processes the digital signal input from AFE 3 and outputs the processed digital signal to AFE 3, and further outputs information, such as remaining capacity and the degradation level, to external load 20. MPU2 is always maintained in an operating state to monitor battery module 10. MPU 2 is supplied with power supply voltage from battery module 10 or main power supply 21 of external load 20 and is always maintained in an operating state.

AFE 3 includes analog-side communication terminal 35, switch-OFF terminal 36, analog-side power supply terminal 33, and analog-side power feeding terminal 34. Analog-side communication terminal 35 is a terminal for AFE 3 to communicate with MPU 2, and, in the example of FIG. 1, corresponds to a serial peripheral interface (SPI) terminal that performs SPI communication. The SPI is a synchronous serial communication that communicates data in synchronization with a clock. AFE 3 performs SPI communication with MPU 2 through the SPI terminal, and receives an instruction to control turning on and off of charge-discharge switching element 13.

Switch-OFF terminal 36 is a terminal for forcibly turning off charge-discharge switching element 13, and is different from the SPI terminal. In the example of FIG. 1, this corresponds to an FETOFF terminal.

Analog-side power supply terminal 33 outputs a predetermined voltage. In the example of FIG. 1, analog-side power supply terminal 33 corresponds to a VDD50 terminal which outputs, to the outside, a voltage ranging from 4.75V to 5.25V.

Analog-side power feeding terminal 34 has a voltage from the outside input thereto. In the example of FIG. 1, analog-side power feeding terminal 34 corresponds to the CVDD terminal. The voltage of 4.75V to 5.25V is input from analog-side power supply terminal 33 to analog-side power feeding terminal 34.

Switch-OFF Circuit 40

Switch-OFF circuit 40 configured to output an OFF signal to switch-OFF terminal 36 so as to turn off charge-discharge switching element 13 in response to a non-operating state of MPU 2. In this configuration, even when MPU 2 is in a non-operating state, that is, an abnormal state due to, e.g., a power supply failure, charge-discharge switching element 13 is reliably turned off through sing switch-OFF terminal 36, thus securing safety.

Figure 2:
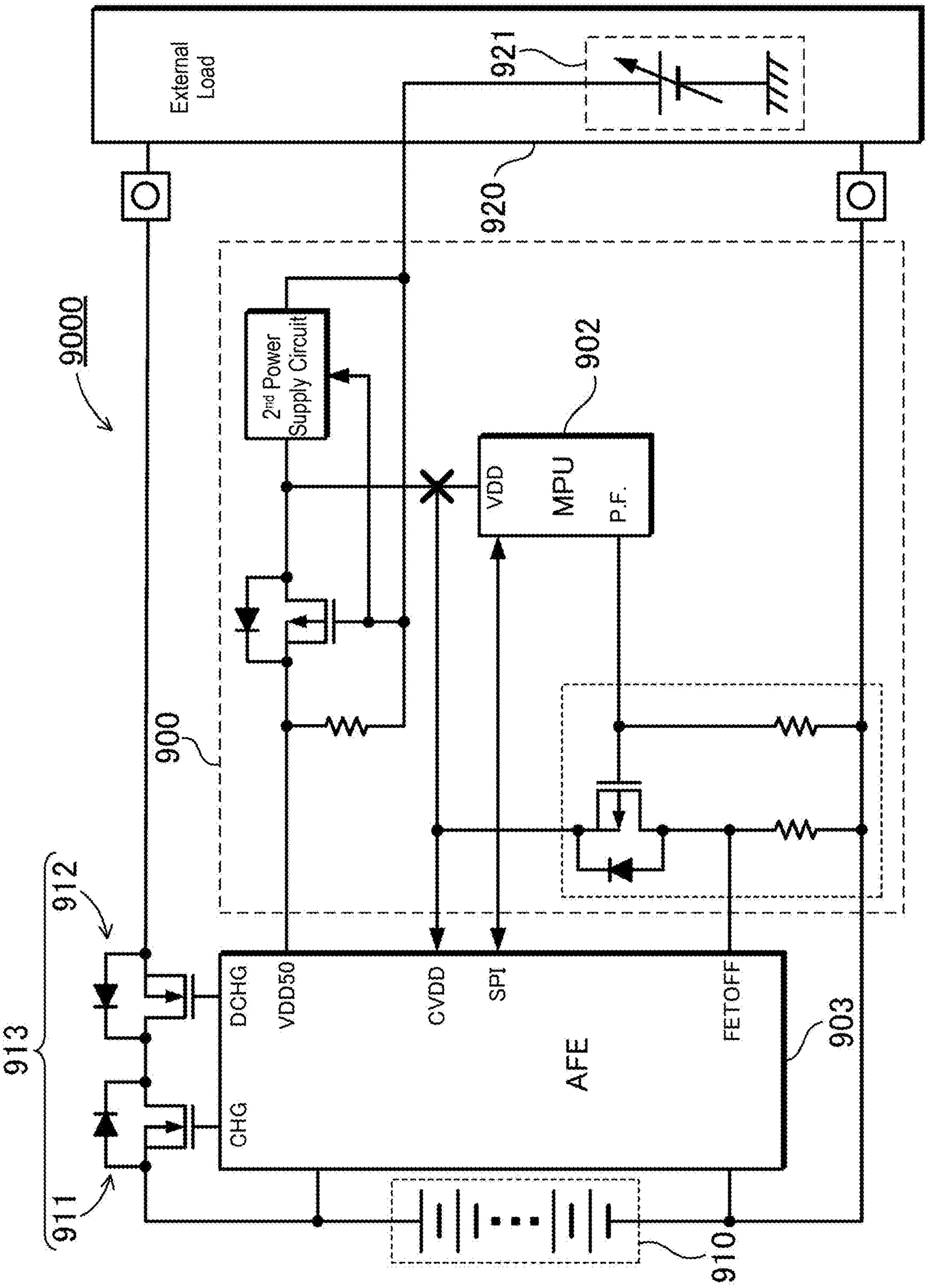
FIG. 2 is a circuit diagram of a power supply device in accordance with a comparative example.

A point focus of the present disclosure will be described below. FIG. 2 shows power supply device 9000 according to a comparative example created by inventors of the present invention. In power supply device 9000, battery module 910 powers external load 920. Power supply control circuit 900 controls charge-discharge switching element 913 to charge and discharge battery module 910. A microcomputer-powering voltage (VDD) powering MPU 902 and an internal circuit powering voltage (CVDD) of AFE 903 are generated by the same external power supply (12 V main power supply 921). MPU 902 determines whether or not to prohibit charging and discharging operations performed by charge-discharge switching element 913 that charges and discharges battery module 910. If MPU 902 prohibits charging and discharging for some reason, MPU 902 communicates with AFE 903 through the SPI terminal to prohibit the charging and discharging. Since AFE 903 controls charge switching element 911 and discharge switching element 912, MPU 902 rewrites a control register of C-FET/D-FET, which is a memory inside AFE 903, to an OFF flag through the SPI communication.

On the other hand, in power supply control circuit 900, when a permanent error occurs, MPU 902 applies a high voltage of a HIGH signal to the FETOFF terminal through the FETOFF terminal of AFE903 in addition to controlling of the register described above. This forcibly turns off charge switching element 911 and discharge switching element 912 to prohibit the charging and discharging.

These controls of turning off charge switching element 911 and discharge switching element 912 are performed under the control of MPU 902. Therefore, if MPU 902 becomes in a non-operating state for some reason, charging and discharging cannot be prohibited.

If the software hangs up, reset is possible using a watchdog timer. However, when VDD that powers MPU 902 fails, MPU 902 per se cannot operate. On the other hand, since AFE 903 can receive power supplied from battery module 910, charging and discharging operations continue. Therefore, if MPU 902 does not operate while the control register of the C-FET/D-FET of AFE 903 that controls charge switching element 911 or discharge switching element 912 is an ON flag, discharging cannot be prohibited even when an abnormality occurs.

In contrast, power supply device 1000 according to the present embodiment avoids the problem by operating switch-OFF circuit 40 that forcibly turns off charge-discharge switching element 13 using a power supply of a separated system that does not depend on the microcomputer powering voltage (VDD) of MPU 2. That is, through VDD50 terminal that is analog-side power supply terminal 33 of AFE 3, switch-OFF circuit 40 supplies a HIGH signal to an FETOFF terminal of AFE 3 when VDD of MPU 2 fails. This configuration reliably allows a HIGH signal to be applied to the FETOFF terminal of AFE 3 even when the VDD fails, thereby reliably prohibit charging and discharging of battery module 10 even when MPU 2 is in a non-operating state.

In the power supply device 1000, a circuit that outputs a High signal is configured to exclusively output a Low signal and a High signal. In accordance with the embodiment, the High signal is distinguished from the Low signal based on voltages thereof such that a voltage of the High signal is lower than that of the Low signal.

Power supply control circuit 100 will be detailed below described with reference to FIG. 1. MPU 2 includes digital-side power feeding terminal 24 and non-operating terminal 26. Digital-side power feeding terminal 24 is a terminal configured to receive, from the outside, power that powers MPU 2, and corresponds to the VDD terminal in example of FIG. 1.

Non-operating terminal 26 outputs a High signal when MPU 2 is in a normal state, and outputs a Low signal when MPU 2 is in an abnormal state. Non-operating terminal 26 changes into a floating state in response to the non-operating time of MPU 2 when no power supply voltage is applied to MPU 2. Therefore, non-operating terminal 26 becomes an output peculiar to the non-operating state by the state change between the operating state in which a power supply voltage is applied to MPU 2 and the non-operating state in which a power supply voltage is not applied to MPU 2. Non-operating terminal 26 corresponds to P.F. terminal in the example of FIG. 1. Non-operating terminal 26 outputs a High signal in a normal state in which MPU 2 operates normally, and outputs a Low signal in an abnormal state in which MPU 2 does not operate normally. Non-operating terminal 26 is in the floating state in a non-operating state in which MPU 2 does not operate.

In switch-OFF circuit 40, when MPU 2 is in a normal state, forced OFF switching element 42 is controlled to be turned off by a HIGH signal output from non-operating terminal 26, and applies a Low signal to switch-OFF terminal 36, and an OFF signal that forcibly turns off charge-discharge switching element 13 is not output. Therefore, AFE 3 is in a state that AFE 3 normally controls charge-discharge switching element 13. Furthermore, in switch-OFF circuit 40, when MPU 2 is in an abnormal state, forced OFF switching element 42 is controlled to be turned on by a Low signal output from non-operating terminal 26, and applies a HIGH signal to switch-OFF terminal 36, and an OFF signal forcibly turning off charge-discharge switching element 13 is output.

In switch-OFF circuit 40, a gate voltage of forced OFF switching element 42 is set to the same voltage as the Low signal by pull-down resistor 44 when non-operating terminal 26 of MPU 2 outputs no signal in response to a state in which MPU 2 cannot receive a supply of power (power supply voltage) from digital-side power feeding terminal 24. Even when power is not supplied to MPU 2, the power supply voltage from first power supply circuit 4 is applied to the source terminal of forced OFF switching element 42, so that when a gate voltage of forced OFF switching element 42 is a voltage of the Low signal, forced OFF switching element 42 is controlled to be turned on, and an OFF signal to switch-OFF terminal 36 to turn off charge-discharge switching element 13 is output. This configuration has an advantageous effect that even when MPU 2 becomes in a non-operating state due to, e.g., power supply failure, charge-discharge switching element 13 is reliably turned off through switch-OFF terminal 36, thus securing safety.

Switch-OFF circuit 40 includes forced OFF switching element 42. Forced OFF switching element 42 outputs an OFF signal to switch-OFF terminal 36 in response to the non-operating state of non-operating terminal 26 so as to turn off charge-discharge switching element 13. Forced OFF switching element 42 outputs a HIGH signal to switch-OFF terminal 36 in response to the floating state. Forced OFF switching element 42 may be implemented by a p-channel FET or a PNP transistor. Pull-down resistor 44 is connected between a gate and drain of the p-channel FET, or between a base and collector terminal in the PNP transistor.

As mentioned above, even in a non-operating state in which MPU 2 is abnormal, power supply control circuit 100 switches the state of forced OFF switching element 42 to turn on forced OFF switching element 42 using a power supply voltage output from analog-side power supply terminal 33 of AFE 3 so as to operate switch-OFF circuit 40 to apply a HIGH signal to switch-OFF terminal 36. Therefore, charge-discharge switching element 13 is forcibly turned off, thereby protecting battery module 10 safely. In particular, even when feeding of electric power to MPU 2 fails, and an operation of switch-OFF circuit 40 cannot be defined in usual state, forced OFF switching element 42 is switched to be turned on, and a HIGH signal is applied to switch-OFF terminal 36, and therefore safety can be maintained and function safety can be secured.

Power supply device 1000 shown in FIG. 1 includes power switching element 6 and second power circuit 5. AFE 3 includes first power supply circuit 4. First power supply circuit 4 supplies a power supply voltage from battery module 10 to MPU 2. Power supply switching element 6 is turned off by a voltage of external electric power supplied from main power supply 21 of external load 20. Second power supply circuit 5 converts external electric power supplied from external load 20 into a power supply voltage of MPU 2, and supplied it to MPU 2 so as to power MPU 2. That is, the power supply voltage of MPU 2 is supplied from second power supply circuit 5 to MPU 2 when power supply switching element 6 is turned off, and the power supply voltage of MPU 2 is supplied from first power supply circuit 4 to MPU 2 when power supply switching element 6 is turned on. When a power supply failure occurs in MPU 2, and MPU 2 becomes in a non-operating at the time of switching of the power supply circuit that supplies a power supply voltage to MPU 2, switch-OFF circuit 40 applies a HIGH signal to switch-OFF terminal of AFE 3 and outputs an OFF signal that turns off the charge-discharge switching element 13.

First Power Supply Circuit 4

First power supply circuit 4 is connected to analog-side power supply terminal 33. First power supply circuit 4 adjusts an output voltage of battery module 10 to a power supply voltage of MPU 2 supplied to MPU 2 through analog-side power supply terminal 33. First power supply circuit 4 converts a voltage of battery module 10 into a power supply voltage of MPU 2 and outputs the converted voltage at the input timing and non-input timing of the external electric power. First power supply circuit 4 supplies a power supply voltage to MPU 2 via power supply switching element 6, and power supply switching element 6 is switched to be turned on at the non-input timing in which external electric power is not supplied, and first power supply circuit 4 supplies a power supply voltage from first power supply circuit 4 to MPU 2. In power supply device 1000 shown in FIG. 1, AFE 3 of the integrated circuit includes first power supply circuit 4, but first power supply circuit 4 is not necessarily included in AFE 3, power supply circuit 4 may be provided as an external circuit of AFE 3. First power supply circuit 4 always outputs an output voltage of battery module 10 as the power supply voltage of MPU 2.

Second Power Supply Circuit 5

Second power supply circuit 5 converts a voltage of an external electric power supplied from main power supply 21 of external load 20 into a power supply voltage of MPU 2, and outputs the converted voltage. Second power supply circuit 5 includes power supply terminal 5*a* into which an external electric power is input, output terminal 5*b* that supplies a power supply voltage to MPU 2, and control terminal 5*c* that controls timing at which a power supply voltage is output from power supply terminal 5*a* to MPU 2. Second power supply circuit 5 includes a DC-DC converter converting a voltage of the external electric power into a power supply voltage of MPU 2. The DC-DC converter becomes in an operation state when an external electric power is input from power supply terminal 5*a*, but the output of the DC-DC converter is controlled by a start signal that is input into control terminal 5*c*. The DC-DC converter is switched between a state in which a power supply voltage to MPU 2 is supplied by operating one of "High" and "Low" as an activating signal, and a state in which the other of "High" and "Low" is not operated as a deactivating signal and a supply voltage is not supplied to MPU 2. In an example of FIG. 1, second power supply circuit 5 converts a voltage of 12 V main power supply 21 into 5 V and outputs the voltage.

Power Supply Switching Element 6

Power supply switching element 6 includes a semiconductor switching element, and an FET can be suitably used. Furthermore, a bipolar transistor may also be used as power supply switching element 6. The FET is turning on and off by a voltage of a gate thereof. Power supply switching element 6 is turning on and off by a voltage of external electric power supplied from main power supply 21 of external load 20. Power supply switching element 6 is turned off when a voltage of external electric power is applied, and is turned on when a voltage of external electric power is not applied. Therefore, in a state in which external power is supplied from main power supply 21 of external load 20, power supply switching element 6 is turned off, and second power supply circuit 5 supplies MPU 2 with a power supply voltage to power MPU 2. While external electric power is not supplied from main power supply 21 of external load 20, power supply switching element 6 is turned on, and first power supply circuit 4 supplies MPU 2 with a power supply voltage to power MPU 2.

Exemplary Embodiment 2

Figure 3:
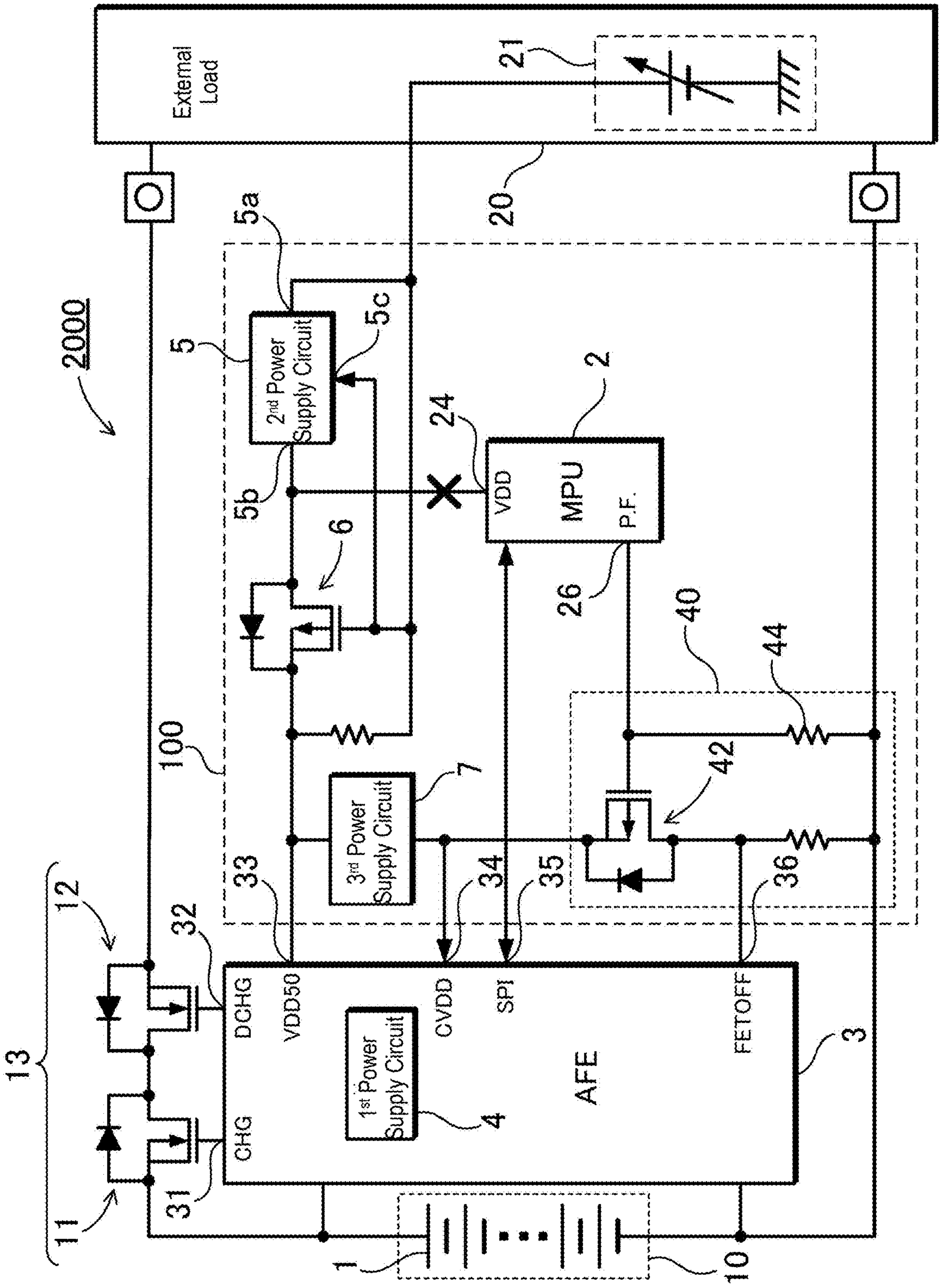
FIG. 3 is a circuit diagram of a power supply device in accordance with Exemplary Embodiment 2 of the present disclosure.

In the above example, a circuit in which both AFE 3 as an analog circuit and MPU 2 as a digital circuit are powered at 5 V, but the present disclosure is not limited to this configuration, and may be configured to be powered at other voltages. FIG. 3 shows an example of a circuit of power supply device 2000 powered at 3.3 V as Exemplary Embodiment 2. In this drawing, components identical to those of Embodiment 1 described above are denoted by the same reference numerals, and their detailed description will be omitted as appropriate.

Power supply device 2000 shown in FIG. 3 includes battery module 10, charge-discharge switching element 13, second power supply circuit 5, and power supply control circuit 100. Power supply control circuit 100 includes an analog circuit, a digital circuit, a switch-OFF circuit 40, and third power supply circuit 7. Both AFE 3 as an analog circuit and MPU 2 as a digital circuit are powered at 3.3 V.

Third power supply circuit 7 is connected to analog-side power supply terminal 33, and converts an output voltage from analog-side power supply terminal 33 into a predetermined voltage. Herein, 4.75 V to 5.25 V output from VDD50 terminal as analog-side power supply terminal 33 is converted into 3.3 V and input into analog-side power feeding terminal 34 as the CVDD terminal of AFE 3. Second power supply circuit 5 converts 12 V of voltage of main power supply 21 into 3.3 V and outputs the converted voltage. Thus, as in FIG. 1, voltage conversion is performed to appropriately power AFE 3 and MPU 2, and even if the power feeding to MPU 2 fails, charge-discharge switching element 13 is forcibly turned off by switch-OFF circuit 40, and operational stability and reliability are secured, and functional safety can be achieved.

INDUSTRIAL APPLICABILITY

A power supply device and a power supply control circuit according to the present disclosure can be suitably used as a power supply for storing electricity for a solar cell, a fuel cell, midnight power, and the like, for household use, commercial use, and factory use, and supplying power to an external load in place of a commercial power supply during a daytime peak cut or a power outage of a commercial power supply or the like. Furthermore, the power supply device and the power supply control circuit can also be used as a control circuit for controlling a power supply for other power supply devices, for example, electrically powered equipment such as an electric cleaner or an electric tool, or as a control circuit for controlling a backup power supply for a server or the like, a power supply for driving an assist bicycle, a power supply for driving an electric scooter, an electric cart, or vehicles such as a hybrid vehicle or an electric vehicle.

REFERENCE MARKS IN THE DRAWINGS

1000, 2000 power supply device
100 power supply control circuit
1 battery cell
2 MPU
3 AFE
4 first power supply circuit
5 second power supply circuit
5*a* power supply terminal
5*b* output terminal
5*c* control terminal
6 power supply switching element
7 third power supply circuit
10 battery module
11 charge switching element
12 discharge switching element
13 charge-discharge switching element
20 external load
21 main power supply
24 digital-side power feeding terminal
26 non-operating terminal

31 CHG terminal
32 DCHG terminal
33 analog-side power supply terminal
34 analog-side power feeding terminal
35 analog-side communication terminal
36 switch-OFF terminal
40 switch-OFF circuit
42 forced OFF switching element
44 pull-down resistor
9000 power supply device
902 MPU
903 AFE
910 battery module
911 charge switching element
912 discharge switching element
913 charge-discharge switching element
920 external load
921 main power supply

The invention claimed is:

1. A power supply device comprising:
a battery module;
a charge-discharge switching element connected in series to the battery module, the charge-discharge switching element being configured to charge and discharge the battery module;
an analog circuit configured to control turning on and off of the charge-discharge switching element;
a digital circuit configured to control the analog circuit;
an analog-side communication terminal configured to receive, from the digital circuit by communication, an instruction controlling the turning on and off of the charge-discharge switching element;
a switch-OFF terminal configured to turn off the charge-discharge switching element, the switch-OFF terminal being different from the analog-side communication terminal; and
a switch-OFF circuit configured to output an OFF signal to turn off the charge-discharge switching element to the switch-OFF terminal in response to a non-operating state of the digital circuit, wherein
the digital circuit includes:
a digital-side power feeding terminal configured to receive, from outside, driving power that powers the digital circuit; and
a non-operating terminal configured to have a state changed from an operating state to a non-operating state in response to a non-operation of the digital circuit, and the switch-OFF circuit is configured to:
output a first signal from the non-operating terminal not to turn off the charge-discharge switching element when the digital circuit is in a normal state;
output a second signal different from the first signal to turn off the charge-discharge switching element when the digital circuit is in an abnormal state and receives the driving power that powers the digital circuit; and
cause the non-operating terminal to be in a floating state when the digital circuit does not receive the driving power that powers the digital circuit and does not operate.

2. The power supply device according to claim 1, wherein the switch-OFF circuit includes a forced OFF switching element configured to output, to the switch-OFF terminal, an OFF signal turning off the charge-discharge switching element in response to the non-operating state of the non-operating terminal.

3. The power supply device according to claim 2, wherein the forced OFF switching element comprises a p-channel FET or a PNP transistor configured to output a HIGH signal to the switch-OFF terminal in response to the floating of the non-operating terminal.

4. The power supply device according to claim 1, wherein the analog circuit includes an analog-side power supply terminal connected to the switch-OFF circuit, and
the switch-OFF circuit is configured to output the OFF signal to the switch-OFF terminal by a voltage output from the analog-side power supply terminal in response to the non-operating state of the digital circuit.

5. The power supply device according to claim 1, wherein the analog circuit includes an analog front end, and
the digital circuit includes a microcomputer.

6. A power supply control circuit configured to operate with a power supply device including a battery module and a charge-discharge switching element connected in series to the battery module, the charge-discharge switching element being configured to charge and discharge the battery module, the power supply control circuit being configured to turn off the charge-discharge switching element when an abnormality occurs, the power supply control circuit comprising:
an analog circuit configured to control turning on and off of the charge-discharge switching element;
a digital circuit configured to control the analog circuit; and
a switch-OFF circuit configured to control the charge-discharge switching element, wherein
the analog circuit includes:
an analog-side communication terminal configured to control the turning on and off of the charge-discharge switching element in response to an instruction from the digital circuit;
a switch-OFF terminal configured to turn off the charge-discharge switching element, the switch-OFF terminal being different from the analog-side communication terminal,
the digital circuit includes:
a digital-side power feeding terminal configured to receive, from outside, driving power that powers the digital circuit; and
a non-operating terminal configured to have a state changed from an operating state to a non-operating state in response to a non-operation of the digital circuit, and the switch-OFF circuit is configured to:
output a first signal from the non-operating terminal not to turn off the charge-discharge switching element when the digital circuit is in a normal state and receives the driving power that powers the digital circuit;
output a second signal different from the first signal to turn off the charge-discharge switching element when the digital circuit is in an abnormal state and receives the driving power that powers the digital circuit; and
cause the non-operating terminal to be in a floating state when the digital circuit does not receive the driving power that powers the digital circuit and does not operate.

* * * * *